US011636030B2

(12) United States Patent
Chen

(10) Patent No.: US 11,636,030 B2
(45) Date of Patent: Apr. 25, 2023

(54) DATA PROCESSING METHOD FOR IMPROVING ACCESS PERFORMANCE OF MEMORY DEVICE AND DATA STORAGE DEVICE UTILIZING THE SAME

(71) Applicant: Silicon Motion, Inc., Hsinchu County (TW)

(72) Inventor: Yu-Ta Chen, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 45 days.

(21) Appl. No.: 17/306,976

(22) Filed: May 4, 2021

(65) Prior Publication Data

US 2022/0004490 A1    Jan. 6, 2022

Related U.S. Application Data

(60) Provisional application No. 63/047,887, filed on Jul. 2, 2020.

(30) Foreign Application Priority Data

Jan. 5, 2021   (TW) .................................. 110100237

(51) Int. Cl.
*G06F 12/02* (2006.01)
*G06F 13/16* (2006.01)

(52) U.S. Cl.
CPC ...... *G06F 12/0246* (2013.01); *G06F 12/0292* (2013.01); *G06F 13/1668* (2013.01); *G06F 2212/7201* (2013.01)

(58) Field of Classification Search
None
See application file for complete search history.

(56) References Cited

U.S. PATENT DOCUMENTS 11,036,625 B1 *  6/2021  Balluchi ............. G06F 12/1054
2010/0306491 A1 * 12/2010  Yoo ..................... G06F 12/0246
                                                            711/202

(Continued)

FOREIGN PATENT DOCUMENTS

TW         201306035 A1     2/2013
TW         201447914 A     12/2014

(Continued)

OTHER PUBLICATIONS

Chen, the specification, including the claims, and drawings in the U.S. Appl. No. 17/246,711, filed May 2, 2021.

(Continued)

*Primary Examiner* — Charles Rones
*Assistant Examiner* — Ryan Dare
(74) *Attorney, Agent, or Firm* — Winston Hsu

(57) ABSTRACT

A data storage device includes a memory device including multiple memory blocks corresponding to multiple sub-regions and a memory controller. The memory controller updates content of a read count table in response to a read command with a transfer length greater than 1 for designating more than one logical address to be read. The read count table includes multiple fields recording a read count associated with one sub-region and content of the read count table is updated by increasing the read count(s) associated with the sub-region(s) that logical addresses designated in the read command belong to. The memory controller selects at least one sub-region according to the content of the read count table and performs a data rearrangement procedure to move data of the logical addresses belonging to the selected at least one sub-region to a first memory space of the memory device having continuous physical addresses.

16 Claims, 10 Drawing Sheets

(56) References Cited

U.S. PATENT DOCUMENTS

| | | |
|---|---|---|
| 2015/0301964 A1 | 10/2015 | Brinicombe |
| 2015/0338990 A1 | 11/2015 | Bae |
| 2017/0123890 A1 | 5/2017 | Haridas |
| 2017/0372448 A1 | 12/2017 | Wald |
| 2018/0107593 A1 | 4/2018 | Ogawa |
| 2018/0300145 A1 | 10/2018 | Lauritzen |
| 2020/0089409 A1 | 3/2020 | Ankireddypalle |
| 2020/0133585 A1* | 4/2020 | Muchherla .......... G06F 12/0246 |
| 2020/0151110 A1 | 5/2020 | Haswell |
| 2020/0167091 A1 | 5/2020 | Haridas |
| 2020/0356280 A1* | 11/2020 | Sela ..................... G11C 11/409 |
| 2020/0387445 A1 | 12/2020 | Byun |
| 2021/0096761 A1* | 4/2021 | Byun .................... G06F 3/0604 |
| 2021/0303208 A1* | 9/2021 | Brief ..................... G06F 3/0659 |
| 2021/0334209 A1* | 10/2021 | Ke ....................... G06F 12/0246 |
| 2021/0397365 A1* | 12/2021 | Kim ..................... G06F 3/0611 |
| 2022/0004341 A1* | 1/2022 | Chen .................... G06F 3/0644 |
| 2022/0004498 A1* | 1/2022 | Chen ................... G06F 12/0246 |
| 2022/0019547 A1* | 1/2022 | Shih .................... G06F 13/1668 |

FOREIGN PATENT DOCUMENTS

| | | |
|---|---|---|
| TW | I585778 B | 6/2017 |
| TW | 201917581 A | 5/2019 |
| TW | I661303 B | 6/2019 |
| TW | I691839 B | 4/2020 |

OTHER PUBLICATIONS

Chen, the specification, including the claims, and drawings in the U.S. Appl. No. 17/306,966, filed May 4, 2021.

* cited by examiner

| Content from Table 2 (4 Bytes) | Content from Table 1 (4 Bytes) |
|---|---|

FIG. 5

| Continuous Length (12 bits) | Content from Table 2 (24 Bytes) | Content from Table 1 (28 Bytes) |
|---|---|---|

FIG. 6

DATA PROCESSING METHOD FOR IMPROVING ACCESS PERFORMANCE OF MEMORY DEVICE AND DATA STORAGE DEVICE UTILIZING THE SAME

CROSS REFERENCE TO RELATED APPLICATIONS

This application claims the benefit of U.S. Provisional Application No. 63/047,887 filed 2020Jul. 2, the entirety of which is incorporated by reference herein.

BACKGROUND OF THE INVENTION

1. Field of the Invention

The invention relates to a data processing method for effectively improving access performance of a memory device and the associated data storage device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In order to assist access operations of the data storage device, one or more mapping tables configured to record mapping relationships between physical addresses and logical addresses are established and maintained by the data storage device. The logical addresses are the addresses mainly utilized by a host device coupled to the data storage device. The host device uses the logical addresses to identify different memory spaces. The physical addresses are the addresses mainly utilized by the data storage device. The data storage device uses the physical addresses to identify different memory spaces. The memory controller manages the mapping tables based on the access operations of the data storage device.

In response to a read command carrying a logical address that the host device attempts to read, the memory controller has to look up the mapping table to retrieve the physical address which actually stores the data of the logical address to be read. However, to lookup or search in the table is a time consuming operation. In addition, the table size usually increases as the memory size of the memory device increases. Therefore, the time required for looking up or searching in the mapping table increases enormously when the size of the mapping table grows.

To solve this problem and to improve the read speed of the memory device, a data processing method for effectively processing data stored in the memory device and improving the access performance of the memory device is highly required.

SUMMARY OF THE INVENTION

It is an objective of the invention to solve the problem as discussed above and to increase the read speed of the memory device.

According to an embodiment of the invention, a data storage device comprises a memory device and a memory controller. The memory device comprises a plurality of memory blocks. The memory blocks correspond to a plurality of logical units, each logical unit corresponds to a plurality of logical addresses, the logical addresses corresponding to each logical unit are divided into a plurality of regions and each region is further divided into a plurality of sub-regions. The memory controller is coupled to the memory device and configured to access the memory device and update content of a read count table in response to a read command, issued by a host device, with a transfer length greater than 1 for designating more than one logical address to be read. The read count table comprises a plurality of fields, each field is configured to record a read count that is associated with one sub-region and the content of the read count table is updated by increasing the read count(s) associated with the sub-region(s) that logical addresses designated in the read command belong to. The memory controller is further configured to select at least one sub-region to be rearranged according to the content of the read count table and perform a data rearrangement procedure to move data of the logical addresses belonging to the selected at least one sub-region to a first memory space of the memory device having continuous physical addresses.

According to another embodiment of the invention, a data processing method for a data storage device comprising a memory device and a memory controller is provided. The memory device comprises a plurality of memory blocks, the memory blocks correspond to a plurality of logical units, each logical unit corresponds to a plurality of logical addresses, the logical addresses of each logical unit are divided into a plurality of regions, and each region is further divided into a plurality of sub-region. The memory controller is coupled to the memory device and configured to access the memory device. The data processing method is performed by the memory controller and comprises: establishing a read count table and updating the content of the read count table in response to a read command issued by a host device with a transfer length greater than 1 for designating more than one logical address to be read, wherein the read count table comprises a plurality of fields and each field is configured to record a read count associated with one sub-region, and the content of the read count table is updated by increasing the read count(s) associated with the sub-region(s) that logical addresses designated in the read command belong to; selecting at least one sub-region to be rearranged according to the content of the read count table; and performing a data rearrangement procedure to move data of the logical addresses belonging to the selected at least one sub-region to a first memory space of the memory device having continuous physical addresses.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram showing an exemplary format for an HPB entry.

FIG. 6 is a schematic diagram showing another exemplary format for an HPB entry.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
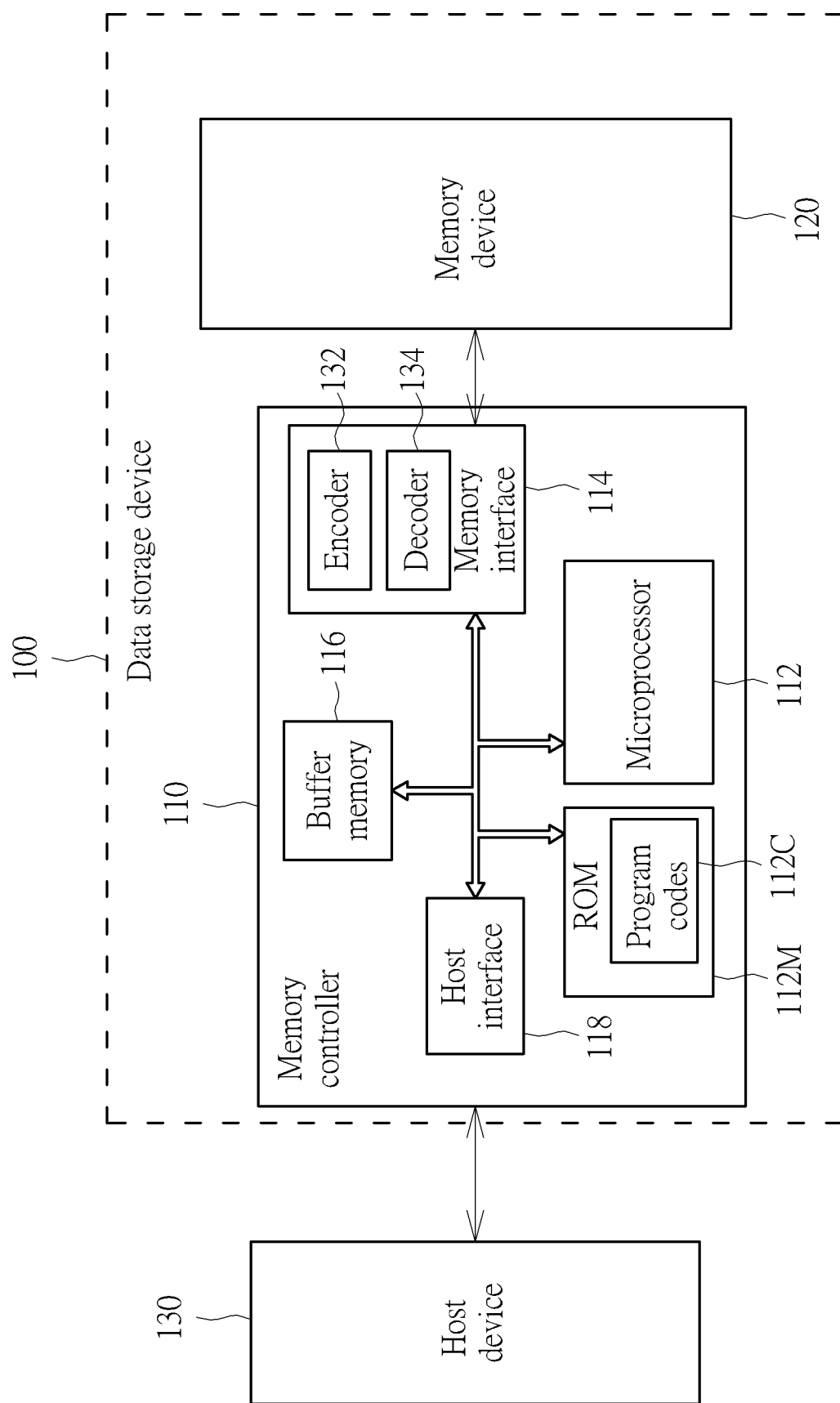
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

The memory device 120 may store a global Logical-to-Physical (L2P) (or called Host-to-Flash (H2F)) mapping table, for the memory controller 110 to access data in the memory device 120. The global L2P mapping table may be located in a predetermined region within the memory device 120, such as a system region, but the invention is not limited thereto. The global L2P mapping table may be divided into a plurality of local L2P mapping tables, and the local L2P mapping tables may be stored in the same or different memory elements. For example, one memory element may store one local L2P mapping table. When needed, the memory controller 110 may load at least one portion (e.g. a portion or all) of the global L2P mapping table into the buffer memory 116 or other memories. For example, the memory controller 110 may load a local L2P mapping table to be a temporary L2P mapping table, for the memory controller 110 to access data in the memory device 120 according to local L2P mapping table, but the invention is not limited thereto.

In order to improve the read performance, the HPB (Host Performance Booster) series standards have been recently promulgated. The HPB uses a memory at the host device side (such as the DRAM of the host device 130) to temporarily store the mapping information maintained by the UFS device (such as the data storage device 100 implemented in compliance with the UFS standards). The mapping information may be retrieved from the global or local L2P mapping table. With the aid of the mapping information, the host device 130 may issue specific read commands (hereinafter called the HPB READ commands) carrying information regarding physical addresses (such as the physical block addresses (PBAs)), which are carried in the HPB entries, corresponding to logical addresses (such as the logical block addresses (LBAs)) that the host device 130 attempts to read to read data. In this manner, as compared to the normal read command, the memory controller 110 could save the time to read and load the global or local L2P mapping table from the memory device 120 and save the time to search the physical addresses corresponding to the logical addresses that the host device 130 attempts to read in the loaded L2P mapping table. Therefore, the read performance can be improved.

Figure 2:
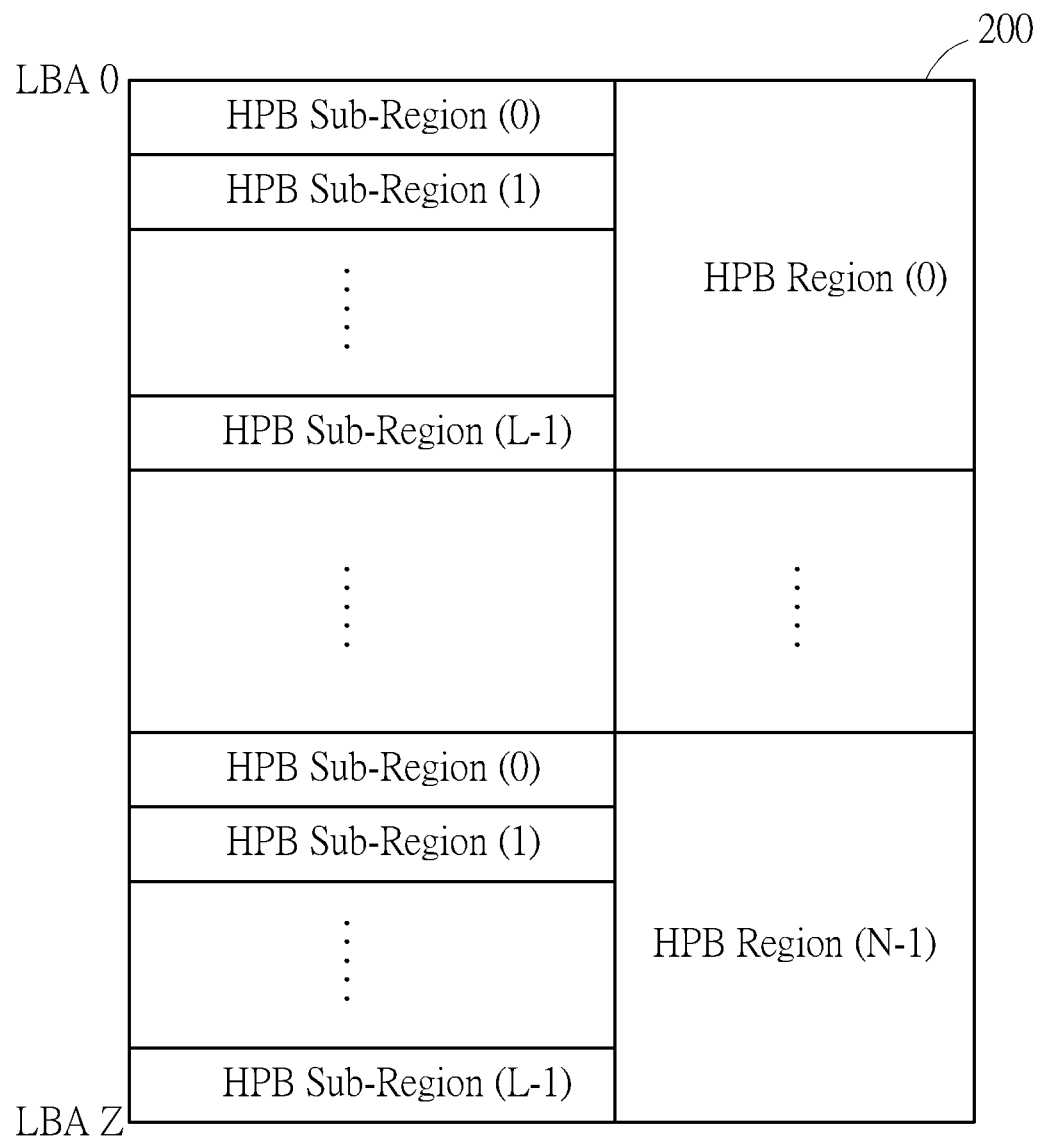
FIG. 2 is a schematic diagram showing an exemplary logical unit and its corresponding LBAs.

Generally, the memory device 120 may be divided into several partitions, each partition may be regarded as a logical unit, and each logical unit may correspond to a plurality of LBAs. FIG. 2 is a schematic diagram showing an exemplary logical unit 200 and its corresponding LBAs. As defined in the HPB specification, the LBAs (such as the LBAs LBA 0-LBA Z, where Z is a positive integer) corresponding to each logical unit may be divided into a plurality of HPB Regions (such as the HPB Region (0)–HPB Region (N–1), where N is a positive integer and greater than 1), and each HPB Region may be further divided into a plurality of HPB Sub-Regions (such as the HPB Sub-Region (0)–HPB Sub-Region (L–1), where L is a positive integer). The size of one HPB Sub-Region (hereinafter called a Sub-Region for brevity) may be smaller than or equal to the size of one HPB Region (hereinafter called a Region for brevity).

In the embodiments of the invention, there are two modes for obtaining the HPB entries, including the Host control mode and the Device control mode.

Figure 3:
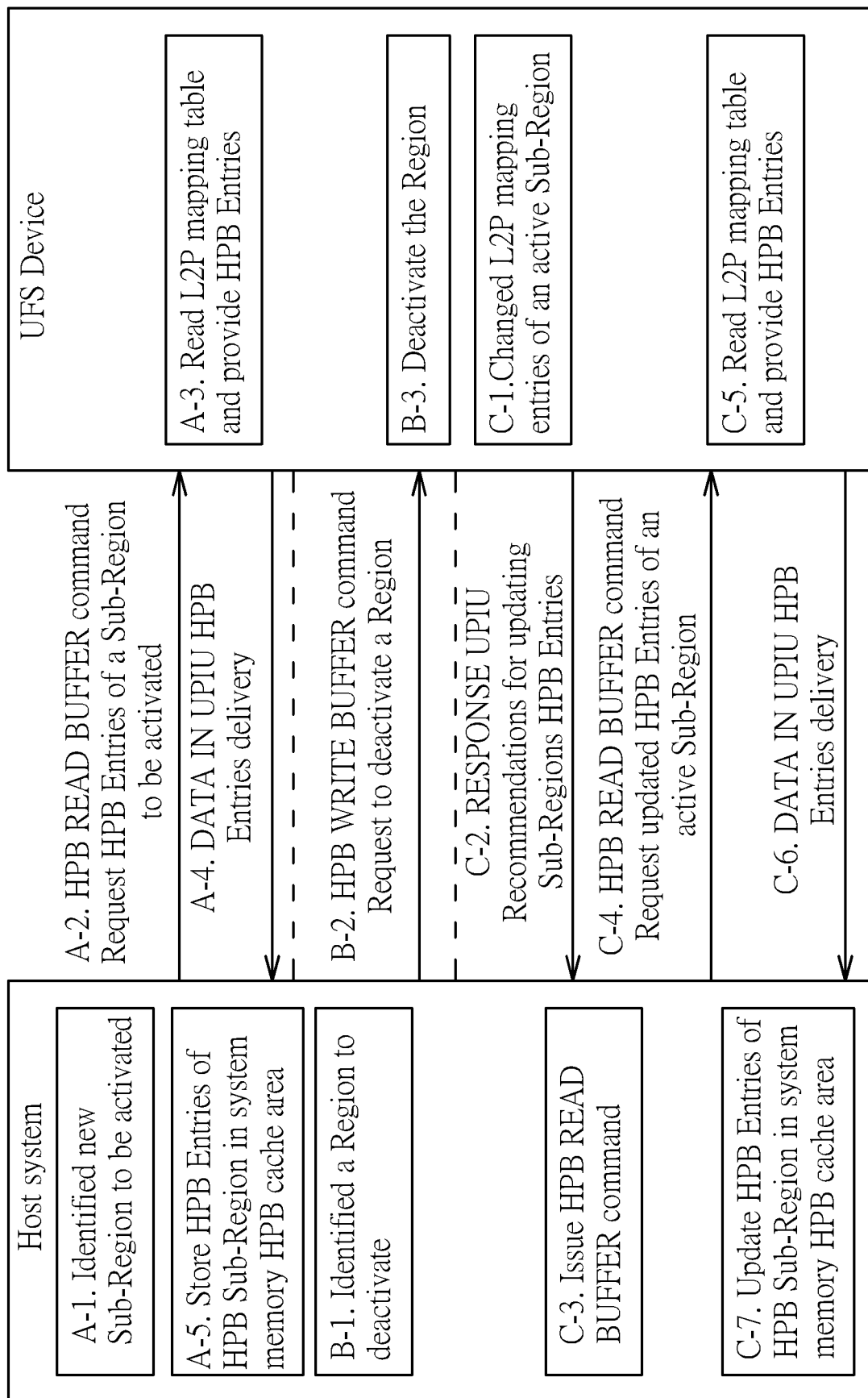
FIG. 3 is a schematic diagram showing operations under the Host control mode.

FIG. 3 is a schematic diagram showing operations under the Host control mode. In the Host control mode, the host system (such as the host device 130) may identify the new Sub-Region to be activated (e.g. the operation A-1) and issue an HPB READ BUFFER command to request the HPB entries of the Sub-Region to be activated (e.g. the operation A-2). In response to reception of the HPB READ BUFFER command, the UFS device (such as the memory controller 110) may read at least a portion of the L2P mapping table (such as the global L2P mapping table or the local L2P mapping table) corresponding to the designated Sub-Region to be activated from the memory device 120 and provide the HPB entries based on the mapping information recorded in the L2P mapping table (e.g. the operation A-3). The UFS device may then deliver the HPB entries via a DATA IN UFS Protocol Information Unit (UPIU) packet to the host system (e.g. the operation A-4). The host system may allocate an HPB area (also referred to as an HPB cache area) in a system memory for storing the HPB entries (e.g. the operation A-5).

The host system may also identify the Region to deactivate (e.g. the operation B-1) and issue an HPB WRITE BUFFER command to request to deactivate a Region (e.g. the operation B-2). In response to reception of the HPB WRITE BUFFER command, the UFS device may deactivate the Region (e.g. the operation B-3).

In addition, when the UFS device determines that update of the HPB entries of any Sub-Region is required, for example, when the UFS device has changed the L2P mapping information (e.g. L2P mapping entries) of an active Sub-Region (e.g. the operation C-1), the UFS device may transmit a RESPONSE UPIU packet to the host system for recommendation for updating Sub-Regions HPB entries (e.g. the operation C-2). The host system may issue an HPB READ BUFFER command in response to reception of the RESPONSE UPIU packet (e.g. the operation C-3) and transmit the HPB READ BUFFER command to the UFS device to request updated HPB entries of an active Sub-Region (e.g. the operation C-4). In response to reception of the HPB READ BUFFER command, the UFS device may read the portion of the L2P mapping table associated with the active Sub-Region and provide the HPB entries based on the mapping information recorded in the L2P mapping table (e.g. the operation C-5). Similarly, the UFS device may deliver the HPB entries via a DATA IN UPIU packet to the host system (e.g. the operation C-6). The host system may update the HPB entries of the HPB Sub-Region stored in the system memory HPB cache area based on the received information (e.g. the operation C-7).

Figure 4:
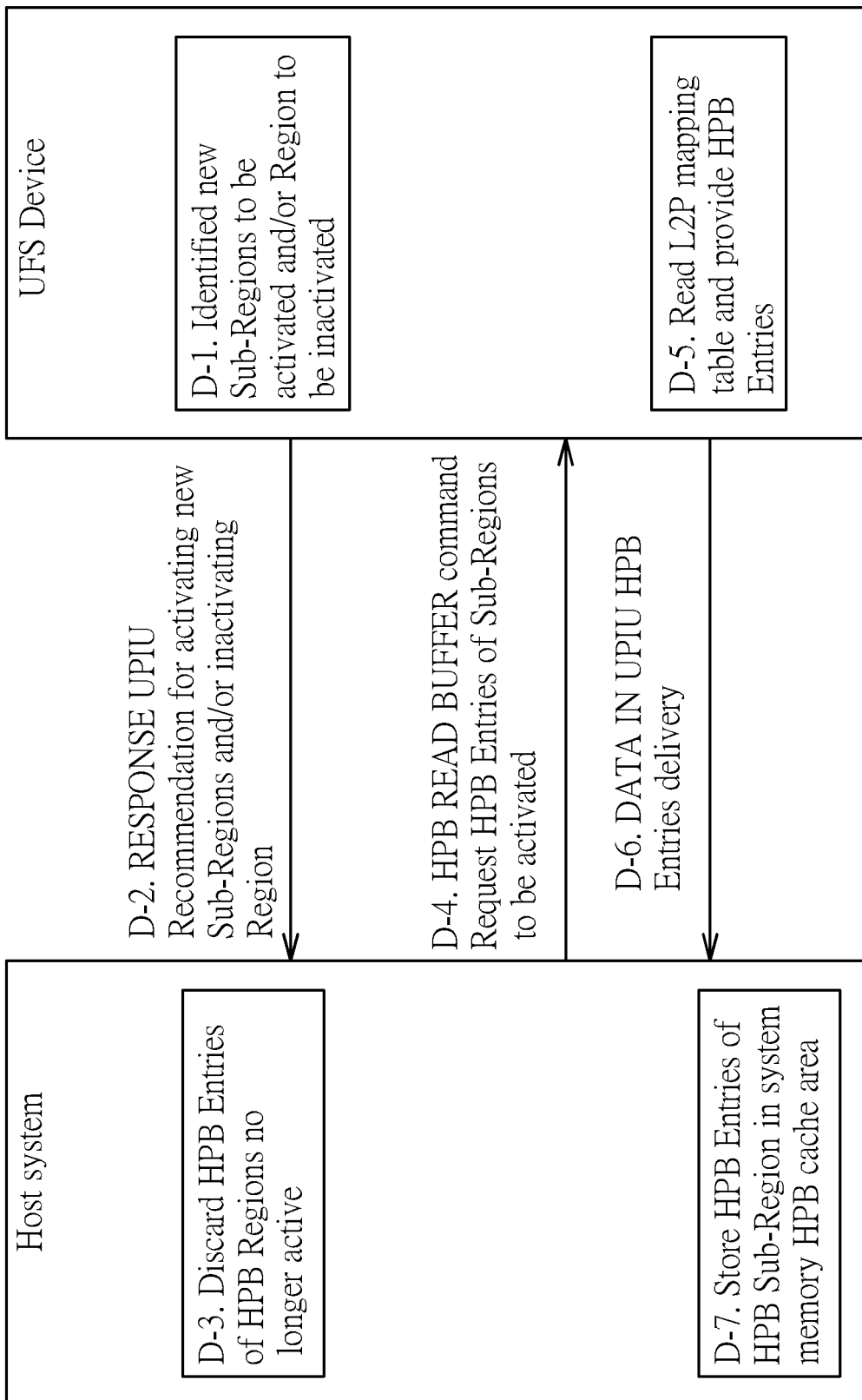
FIG. 4 is a schematic diagram showing operations under the Device control mode.

FIG. 4 is a schematic diagram showing operations under the Device control mode. In the Device control mode, the UFS device may identify the new Sub-Regions to be activated and/or a Region to be inactivated (e.g. the operation D-1) and transmit a RESPONSE UPIU packet to the host system for recommendation for activating the new Sub-Regions and/or inactivating the Region (e.g. the operation D-2). Regarding inactivating the Region, in response to reception of the RESPONSE UPIU packet, the host system may discard the HPB entries of the HPB Regions no longer active (e.g. the operation D-3). Regarding activating the new Sub-Regions, the host system may issue an HPB READ BUFFER command to the UFS device to request the HPB entries of the new Sub-Regions to be activated (e.g. the operation D-4). Similarly, in response to reception of the HPB READ BUFFER command, the UFS device may read at least a portion of the L2P mapping table (such as read the global L2P mapping table or the local L2P mapping table) corresponding to the designated Sub-Region to be activated from the memory device 120 and provide the HPB entries based on the mapping information recorded in the L2P mapping table (e.g. the operation D-5). The UFS device may then deliver the HPB entries via a DATA IN UPIU packet to the host system (e.g. the operation D-6). The host system may allocate an HPB area (also referred to as an HPB cache area) in a system memory for storing the HPB entries (e.g. the operation D-7).

FIG. 5 is a schematic diagram showing an exemplary format for an HPB entry. In an exemplary embodiment, the size of one HPB entry is 8 Bytes. In this exemplary format, four bytes may be utilized to carry the mapping information (for example, the physical address) obtained from the L2P mapping table (such as the global or local L2P mapping table, or a temporary L2P mapping table loaded by the memory controller 110 in the buffer memory 116), and the other four bytes may be utilized to carry another physical address indicating where the aforementioned global or local L2P mapping table is physically stored in the flash memory. To be more specific, in the exemplary format shown in FIG. 5, the first 4 bytes PBA and the second 4 bytes PBA are combined to form an HPB entry. The first PBA is a PBA recorded in the Table 1 (also referred to as the T1 table), and this PBA is mapped by an LBA. The second PBA is a PBA recorded in the Table 2 (also referred to as the T2 table), and this PBA is the PBA of the T1 table. Here, the T1 table may be the global or local L2P mapping table stored in the memory device 120, and the T2 table may be a system table recording the corresponding addresses at which the management tables (for example, the global or local L2P mapping tables) are physically stored in the memory device 120.

Because the memory controller 110 may allocate another memory space to store a management table (such as the global or local L2P mapping table) when the content (such as the mapping information) of this management table has to be updated, when the PBA mapped by an LBA is changed, not only the content of the T1 table is modified but also the updated T1 table is stored in a new space of the memory device 120. Therefore, the corresponding physical address of the T1 table recorded in the system table may change as well. In this manner, the content of the T2 table carried in an HPB entry (e.g. the "Content from Table 2" as shown in FIG. 5) may be utilized to verify if the data stored in a PBA mapped by an LBA corresponding to (or, associated with) this HPB entry is still valid. When the content of the T2 table carried in the HPB entry is the same as the corresponding physical address of the latest T1 table maintained by the memory controller 110, the data stored in this PBA, that is, the content of the T1 table carried in the HPB entry, (e.g. the "Content from Table 1" as shown in FIG. 5) is regarded as valid. Otherwise, the data stored in this PBA carried in the HPB entry is regarded as invalid. Noted that verification of whether the data of a PBA is still valid may be performed by the memory controller 110 at the data storage device side.

The following HPB Entry Table 1 illustrates a first exemplary HPB entry table, where the notation " . . . " indicates that some table contents may be omitted for brevity. The T1 and T2 contents (e.g. hexadecimal values) of HPB Entry Table 1 may represent the contents obtained from the aforementioned T1 and T2 tables, respectively. The physical addresses {0x0000A000, 0x0000A001, . . . } that appear in the T1 content fields may be taken as examples of the physical addresses mapped by the series of logical addresses associated with the HPB entry {0, 1 . . . }, and the physical address 0x00004030 that repeatedly appears in the physical addresses {0x00004030, 0x00004030, . . . } in the T2 content fields may be taken as an example of the physical address of the T1 table, which may be a local L2P mapping table.

| HPB Entry Table 1 | | |
|---|---|---|
| HPB entry | T2 Content | T1 Content |
| 0 | 0x00004030 | 0x0000A000 |
| 1 | 0x00004030 | 0x0000A001 |
| 2 | 0x00004030 | 0x0000A002 |
| 3 | 0x00004030 | 0x0000A003 |
| 4 | 0x00004030 | 0x0000A004 |
| 5 | 0x00004030 | 0x0000A005 |
| 6 | 0x00004030 | 0x0000B009 |
| 7 | 0x00004030 | 0x0000A007 |
| 8 | 0x00004030 | 0x0000A008 |
| 9 | 0x00004030 | 0x0000A009 |
| 10 | 0x00004030 | 0x0000A00A |
| 11 | 0x00004030 | 0x0000B00A |
| 12 | 0x00004030 | 0x0000A00C |
| . . . | . . . | . . . |

FIG. 6 is a schematic diagram showing another exemplary format for an HPB entry. In this exemplary format, 28 bits may be utilized to carry the mapping information obtained from L2P mapping table (such as the global or local L2P mapping table, or a temporary L2P mapping table loaded by the memory controller 110 in the buffer memory 116), 24 bits may be utilized to carry the physical address where the global or local L2P mapping table is physically stored in the flash memory, and the remaining 12 bits may be utilized to carry the continuity information regarding the associated LBA. To be more specific, in the exemplary format shown in FIG. 6, a first PBA is combined with a second PBA and the continuity information of an LBA to form an HPB entry. The first PBA is a PBA stored in T1 table and is the PBA mapped by the associated LBA (e.g. the "Content from Table 1" as shown in FIG. 6). The second PBA is a PBA stored in T2 table and is the PBA of this T1 table (e.g. the "Content from Table 2" as shown in FIG. 6). In the embodiments of the invention, the continuity information may be represented as a value indicating a continuous length or a continuous bit table (e.g. the "Continuous Length" as shown in FIG. 6).

The following HPB Entry Table 2 illustrates a second exemplary HPB entry table, where the notation ". . . " indicates that some table contents may be omitted for brevity. The physical addresses {0x000A000, 0x000A001, . . . , 0x000A005, 0x000B009, 0x000A007, . . . , 0x000A00A, 0x000B00A, 0x000A00C, . . . } that appear in the T1 Content fields may be taken as examples of the physical addresses mapped by the series of logical addresses associated with the HPB entry {0, 1 . . . }, and the physical address 0x004030 that repeatedly appears in the physical addresses {0x004030, 0x004030, . . . } in the T2 Content fields may be taken as an example of the physical address of the T1 table, which may be a local L2P mapping table.

HPB Entry Table 2

| HPB entry | Continuous Length | T2 Content | T1 Content |
|---|---|---|---|
| 0 | 0x5 | 0x004030 | 0x000A000 |
| 1 | 0x4 | 0x004030 | 0x000A001 |
| 2 | 0x3 | 0x004030 | 0x000A002 |
| 3 | 0x2 | 0x004030 | 0x000A003 |
| 4 | 0x1 | 0x004030 | 0x000A004 |
| 5 | 0x0 | 0x004030 | 0x000A005 |
| 6 | 0x0 | 0x004030 | 0x000B009 |
| 7 | 0x3 | 0x004030 | 0x000A007 |
| 8 | 0x2 | 0x004030 | 0x000A008 |
| 9 | 0x1 | 0x004030 | 0x000A009 |
| 10 | 0x0 | 0x004030 | 0x000A00A |
| 11 | 0x0 | 0x004030 | 0x000B00A |
| 12 | . . . | 0x004030 | 0x000A00C |
| . . . | . . . | . . . | . . . |

In addition, the memory controller 110 may calculate and generate (e.g. record and/or update) the number of continuous physical addresses coming after the physical address of an HPB entry among the associated physical addresses in the HPB entry table, to be the continuous length. For example, regarding the HPB entry 0, the memory controller 110 may calculate and generate (e.g. record and/or update) the number of the continuous physical addresses {0x000A001, . . . , 0x000A005} coming after the physical address 0x000A000 among the physical addresses {0x000A000, 0x000A001, . . . , 0x000A005, 0x000B009, 0x000A007, . . . , 0x000A00A, 0x000B00A, 0x000 A00C, . . . }, to be the continuous length of the HPB entry 0 (such as 0x5 in this example); regarding the HPB entry 1, the memory controller 110 may calculate and generate (e.g. record and/or update) the number of the continuous physical addresses {0x000A002, . . . , 0x000A005} coming after the physical address 0x000A001 among the physical addresses {0x000A000, 0x000A001, . . . , 0x000A005, 0x000B009, 0x000A007, . . . , 0x000A00A, 0x000B00A, 0x000A00C, . . . }, to be the continuous length of the HPB entry 1 (such as 0x4 in this example); and the rest may be deduced by analogy.

The following HPB Entry Table 3 illustrates a third exemplary HPB entry table, where the notation ". . . " indicates that some table contents may be omitted for brevity. The physical addresses {0x000A000, 0x000A001, . . . , 0x000A005, 0x000B009, 0x000A007, . . . , 0x000A00A, 0x000B00A, 0x000A00C, 0x000A00D, 0x000A00E, 0x000A00F, . . . } that appear in the T1 Content fields may be taken as examples of the physical addresses mapped by the series of logical addresses associated with the HPB entry {0, 1 . . . }, and the physical address 0x004030 that repeatedly appears in the physical addresses {0x004030, 0x004030, . . . } in the T2 Content fields may be taken as an example of the physical address of the T1 table, which may be a local L2P mapping table.

HPB Entry Table 3

| HPB entry | Continuous Bit Table | T2 Content | T1 Content |
|---|---|---|---|
| 0 | 0xBDF (101111011111) | 0x004030 | 0x000A000 |
| 1 | 0xDEF (110111101111) | 0x004030 | 0x000A001 |
| 2 | 0xEF7 (111011110111) | 0x004030 | 0x000A002 |
| 3 | 0xF7B (111101111011) | 0x004030 | 0x000A003 |
| 4 | . . . | 0x004030 | 0x000A004 |
| 5 | . . . | 0x004030 | 0x000A005 |
| 6 | . . . | 0x004030 | 0x000B009 |
| 7 | . . . | 0x004030 | 0x000A007 |
| 8 | . . . | 0x004030 | 0x000A008 |
| 9 | . . . | 0x004030 | 0x000A009 |
| 10 | . . . | 0x004030 | 0x000A00A |
| 11 | . . . | 0x004030 | 0x000B00A |
| 12 | . . . | 0x004030 | 0x000A00C |
| 13 | . . . | 0x004030 | 0x000A00D |
| 14 | . . . | 0x004030 | 0x000A00E |
| 15 | . . . | 0x004030 | 0x000A00F |
| . . . | . . . | . . . | . . . |

In addition, the memory controller 110 may check respectively continuity of multiple subsequent physical addresses coming after the physical address of an HPB entry among the associated physical addresses in the HPB entry table, to generate the continuous bit table indicating the respective continuity of the multiple subsequent physical addresses. For example, regarding the HPB entry 0, the memory controller 110 may check respectively continuity of 12 subsequent physical addresses {0x000A001, . . . , 0x000A005, 0x000B009, 0x000A007, . . . , 0x000A00A, 0x000B00A, 0x000A00C} coming after the physical address 0x000A000 among the associated physical addresses {0x000A000, 0x000A001, . . . , 0x000A005, 0x000B009, 0x000A007, . . . , 0x000A00A, 0x000B00A, 0x000A00C, 0x000A00D, 0x000A00E, 0x000A00F, . . . }, to generate the continuous bit table 0xBDF indicating the respective continuity of the 12 subsequent physical addresses {0x000A001, . . . , 0x000A005, 0x000B009, 0x000A007, . . . , 0x000A00A, 0x000B00A, 0x000A00C}, where the continuous bit table 0xBDF may be expanded as 101111011111, starting from the least significant bit (LSB) to the most significant bit (MSB) thereof, and where Bits 0-11 of 101111011111 (e.g. the 12 bits starting from the LSB) may indicate the respective continuity of the 12 subsequent physical addresses {0x000A001, . . . , 0x000A005, 0x000B009, 0x000A007, . . . , 0x000A00A, 0x000B00A, 0x000A00C}; regarding the HPB entry 1, the memory controller 110 may check respectively continuity of 12 subsequent physical addresses {0x000A002, . . . , 0x000A005, 0x000B009, 0x000A007, . . . , 0x000A00A, 0x000B00A, 0x000A00C, 0x000A00D} coming after the physical address 0x000A001 among the associated physical addresses {0x000A000, 0x000A001, . . . , 0x000A005, 0x000B009, 0x000A007, . . . , 0x000A00A, 0x000B00A, 0x000A00C, 0x000A00D, 0x000A00E, 0x000A00F, . . . }, to generate the continuous bit table 0xDEF indicating the respective continuity of the 12 subsequent physical addresses {0x000A002, . . . , 0x000A005, 0x000B009, 0x000A007, . . . , 0x000A00A, 0x000B00A, 0x000A00C, 0x000A00D}, where the continuous bit table 0xDEF may be expanded as 110111101111, starting from the LSB to the MSB thereof, where Bits 0-11 of 110111101111 (e.g. the 12 bits starting from the LSB) may indicate the respective continuity of the 12 subsequent physical addresses {0x000A002, . . . , 0x000A005, 0x000B009, 0x000A007, . . . , 0x000A00A, 0x000B00A, 0x000A00C, 0x000A00D}; and the rest may be deduced by analogy.

Figure 7:
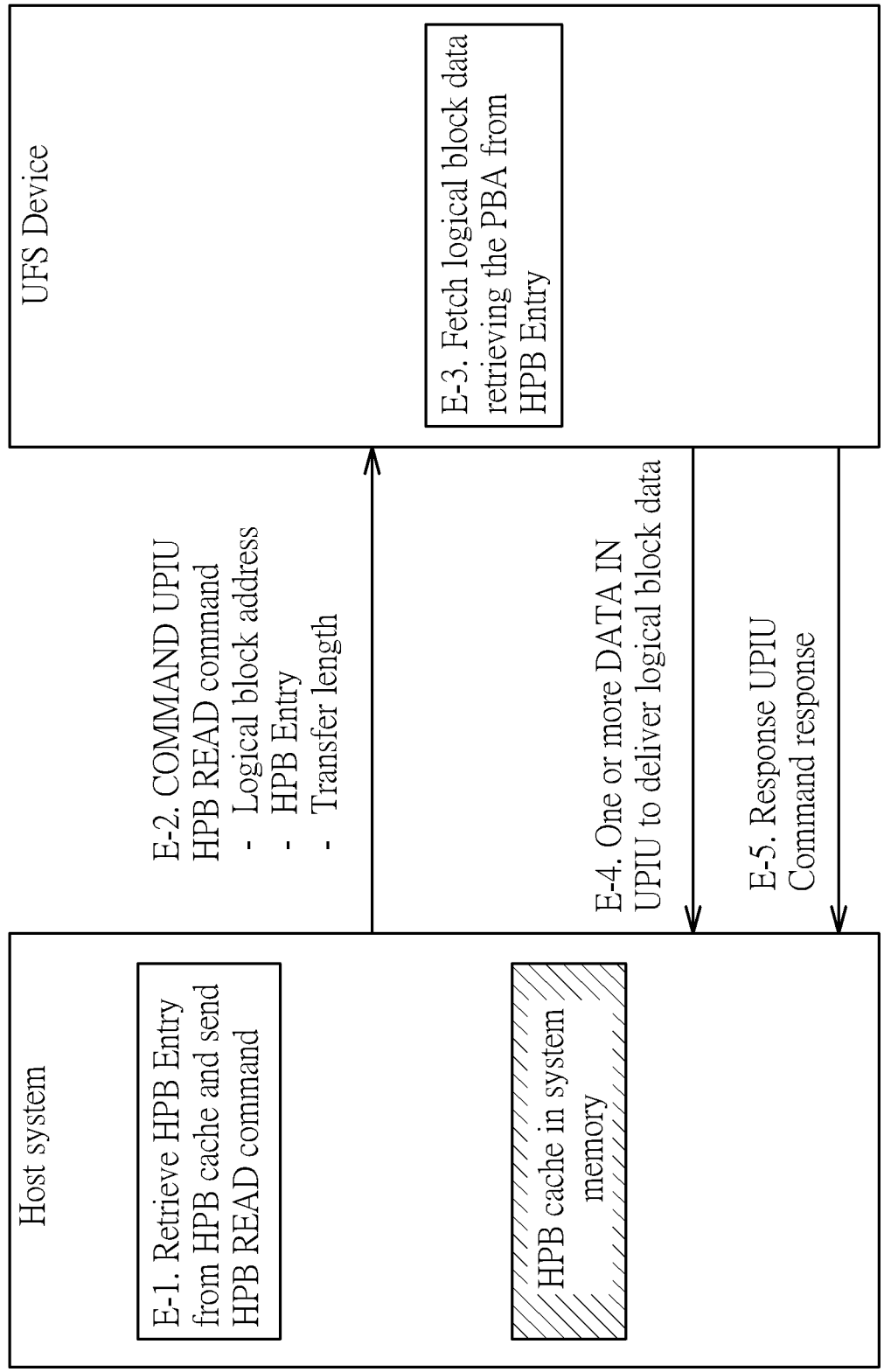
FIG. 7 is a schematic diagram showing operations corresponding to the HPB READ command.

With the aid of the HPB entries, the host device 130 may issue the HPB READ commands carrying information regarding a starting logical address that the host device 130 attempts to read, a transfer length and the HPB entry to read data. FIG. 7 is a schematic diagram showing operations corresponding to the HPB READ command. The host system may retrieve HPB entry from the HPB cache and send an HPB READ command (e.g. the operation E-1) carrying an LBA (such as the starting LBA), the HPB entry corresponding to this LBA and a TRANSFER LENGTH via an HPB READ command UPIU packet to the UFS device (e.g. the operation E-2). In a specific embodiment, the TRANSFER LENGTH is limited to 1, but the invention should not be limited thereto. In other embodiments of the invention, the TRANSFER LENGTH may be any positive integer. For example, in the HPB 2.0 standards, the TRANSFER LENGTH may be set to a positive integer greater than 1. Upon receiving the HPB READ command, the UFS device may decode the received HPB entry corresponding to the designated LBA that the host system attempts to read to obtain information regarding the physical address or the PBA of the designated LBA and access the memory device according to the physical address or the PBA to obtain or fetch the data that the host system attempts to read (e.g. the operation E-3). The UFS device may determine whether the received HPB entry is stall valid in the operation E-3. For example, the UFS device may determine whether the received HPB entry is stall valid by determining whether the content of the T2 table carried in the HPB entry is the same as the corresponding physical address of the latest T1 table maintained by the memory controller 110. When the received HPB entry is determined stall valid, the USF device may obtain the data that the host device 130 attempts to read (e.g. the "logical block data" shown in FIG. 6) and transmit one or more DATA IN UPIU packets to the host system to deliver the data to the host system (e.g. the operation E-4) and transmit a RESPINSE UPIU Command to the host system (e.g. the operation E-5) after the data delivery, where the "logical block data" refers to the data corresponding to the LBA that the host device 130 attempts to read. On the other hand, when the received HPB entry is determined invalid, the UFS device may skip the operation E-4 and directly perform the operation E-5 to recommend for updating the corresponding the HPB entries by transmitting a RESPINSE UPIU Command packet to the host system.

It should be noted that in some embodiments of the invention, the UFS device may actively recommend the host system to update the HPB entry, for example, as in the operation C-2, the UFS device may transmit a RESPONSE UPIU packet to the host system for recommendation for updating Sub-Regions HPB entries, or as in the operation D-2, the UFS device may transmit a RESPONSE UPIU packet to the host system for recommendation for activating the new Sub-Regions. In other embodiments of the invention, the UFS device may also not actively recommend the host system to update the HPB entry. In such embodiments, the UFS device may transmit a RESPONSE UPIU packet to the host system for recommending the host system to update the HPB entry after determining that the corresponding HPB entry is invalid. For example, upon receiving the HPB READ command, the UFS device may recommend the host system to update the HPB entry by transmitting a RESPONSE UPIU packet to the host system when determining that the received HPB entry is invalid in the aforementioned operation E-3.

As mentioned above, since the TRANSFER LENGTH may be set to a positive integer greater than 1, that is, the host device 130 may attempt to read the data of more than one LBA, how to improve continuity of the data of multiple continuous logical addresses physically stored in the memory device 120 becomes an issue worthy to be concerned.

In the embodiments of the invention, the memory controller 110 may record and/or analyze the access behaviors of the host device 130, select one or more Sub-Regions having data to be rearranged based on the recorded access behaviors and actively perform a data rearrangement procedure to move or rewrite data of the selected one or more Sub-Regions to a memory space (for example, a memory block) of the memory device 120 having continuous physical addresses.

According to a first embodiment of the invention, the memory controller 110 may establish an activated count table (such as a Sub-Region activated count table) and maintain or update the content of the activated count table in response to the commands issued by the host device 130. The activated count table may comprise a plurality of fields. Each field may be configured to record an activated count that is associated with one Sub-Region (e.g. the HPB Sub-Region). Therefore, the number of fields in the activated count table may be equal to the total number of HPB Sub-Regions comprised in the memory device 120. As discussed above, the memory device 120 may be divided into several partitions, and each partition may be regarded as a logical unit corresponding to a plurality of LBAs. The LBAs of each logical unit may be divided into a plurality of HPB Regions, and each HPB Region may be further divided into a plurality of HPB Sub-Regions. Therefore, in the embodiments of the invention, each logical unit may comprise a plurality of regions and each region may comprise a plurality of sub-regions.

In the first embodiment of the invention, the activated count associated with one Sub-Region is utilized to record the number of times that the associated Sub-Region is activated by the host device 130. For example, the activated count may be a count value for counting the number of times that the associated Sub-Region is requested to be activated. According to an embodiment of the invention, the memory controller 110 may update the content of the activated count table in response to the HPB READ BUFFER commands issued by the host device 130. As discussed above, the host system (such as the host device 130) may identify the new Sub-Region to be activated and issue the HPB READ BUFFER command to request the HPB entries of the Sub-Region to be activated. Therefore, one or more Sub-Regions to be activated may be identified by the host device 130 and carried in the HPB READ BUFFER command, or some related information may be carried in the HPB READ BUFFER command. In response to reception of the HPB READ BUFFER command, the memory controller 110 may update the content of the activated count table by increasing one or more activated counts (e.g. +1 for each activation) associated with the one or more Sub-Regions identified to be activated in the command.

According to an embodiment of the invention, the memory controller 110 may further sort the activated counts recorded in the activated count table and select one or more Sub-Regions having data to be rearranged according to the sorted activated counts. For example, the memory controller 110 may select one or more Sub-Regions having the activated counts greater than a predetermined value as the one or more Sub-Regions to be rearranged. In an embodiment, the memory controller 110 may sequentially select the Sub-Region(s) having the greatest activated count according to the sorted activated counts and perform a corresponding data rearrangement procedure on the selected Sub-Region(s), and then remove the activated count of the selected Sub-Region(s) that has been rearranged from the sorted activated counts. The selection and data rearrangement procedure may be repeatedly performed on different Sub-Regions when required.

Figure 8:
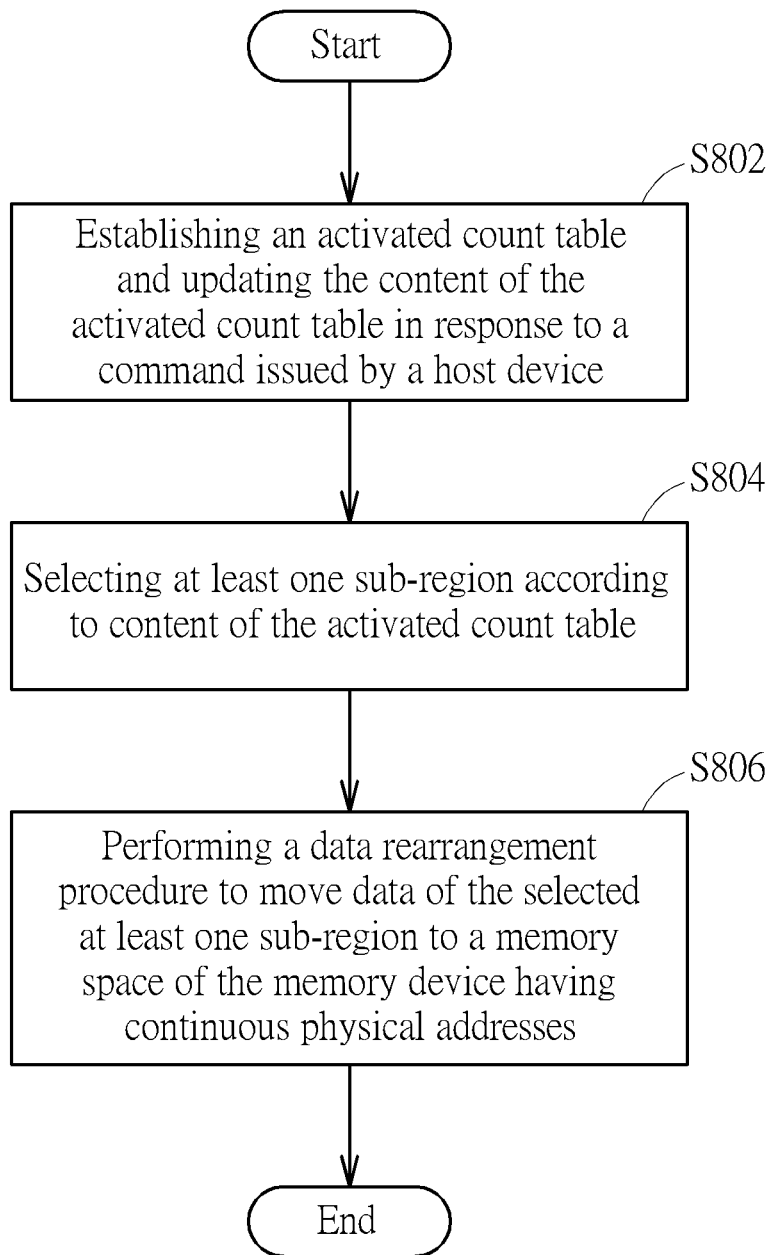
FIG. 8 is a flow chart of a data processing method according to a first embodiment of the invention.

FIG. 8 is a flow chart of a data processing method for a data storage device according to a first embodiment of the invention. The method may be performed by the memory controller 110 and comprise the following steps:

S802: Establishing an activated count table and updating the content of the activated count table in response to a command issued by a host device. In the embodiments of the invention, one or more sub-regions to be activated are identified in the command.

S804: Selecting at least one sub-region having data to be rearranged according to content of the activated count table.

S806: Performing a data rearrangement procedure to move (or, remove or rewrite) data of the selected at least one sub-region to a memory space of the memory device having continuous physical addresses.

Note that the data processing method in the first embodiment of the invention may be applied under the Host control mode or the Device control mode.

According to a second embodiment of the invention, the memory controller 110 may establish a read count table (such as a Sub-Region read count table) and maintain or update the content of the read count table in response to the read commands issued by a host device 130, where a read command carries at least one designated logical address. The read count table may comprise a plurality of fields. Each field may be configured to record a read count that is associated with one Sub-Region (e.g. the HPB Sub-Region). Therefore, the number of fields in the read count table may be equal to the total number of HPB Sub-Regions comprised in the memory device 120. As discussed above, the memory device 120 may be divided into several partitions, and each partition may be regarded as a logical unit corresponding to a plurality of LBAs. The LBAs of each logical unit may be divided into a plurality of HPB Regions, and each HPB Region may be further divided into a plurality of HPB Sub-Regions. Therefore, in the embodiments of the invention, each logical unit may comprise a plurality of regions and each region may comprise a plurality of sub-regions.

In the second embodiment of the invention, the read count associated with one Sub-Region is utilized to record the number of times that the associated Sub-Region is read by the host device 130. For example, the read count may be a count value for counting the number of times that the host device 130 issues the commands to read the data of the logical addresses comprised in the associated Sub-Region. According to an embodiment of the invention, the memory controller 110 may update the content of the read count table in response to the normal read commands issued by the host device 130. In response to reception of a read command carrying a starting LBA and a data length to be read, the memory controller 110 may update the content of the read count table by increasing (e.g. +1 for each read command) one or more read counts associated with the one or more Sub-Regions that the at least one designated logical address (such as the starting LBA and the subsequent LBA(s) derived from the starting LBA and the data length) belongs to. According to another embodiment of the invention, the memory controller 110 may update the content of the read count table in response to the read commands issued by the host device 130 with the data length greater than a predetermined length threshold, for designating more than one logical address to be read. For example, the memory controller 110 may update the content of the read count table by increasing (e.g. +1 for each read command) one or more read counts associated with the one or more Sub-Regions that the designated logical addresses (such as the starting LBA and the subsequent LBA(s) derived from the starting LBA and the data length) belong to.

According to an embodiment of the invention, the memory controller 110 may further sort the read counts recorded in the read count table and select one or more Sub-Regions having data to be rearranged according to the sorted read counts. For example, the memory controller 110 may select one or more Sub-Regions having the read counts greater than a predetermined value as the one or more Sub-Regions to be rearranged. In an embodiment, the memory controller 110 may sequentially select the Sub-Region(s) having the greatest read count according to the sorted read counts and perform a corresponding data rearrangement procedure on the selected Sub-Region(s), and then remove the read count of the selected Sub-Region(s) that has been rearranged from the sorted read counts. The selection and data rearrangement procedure may be repeatedly performed on different Sub-Regions when required.

According to another embodiment of the invention, the memory controller 110 may calculate an average read count according to the read counts recorded in the read count table and select the at least one sub-region to be rearranged according to the average read count. For example, the memory controller 110 may select one or more Sub-Regions having the read counts greater than the average read count as the one or more Sub-Regions to be rearranged.

Figure 9:
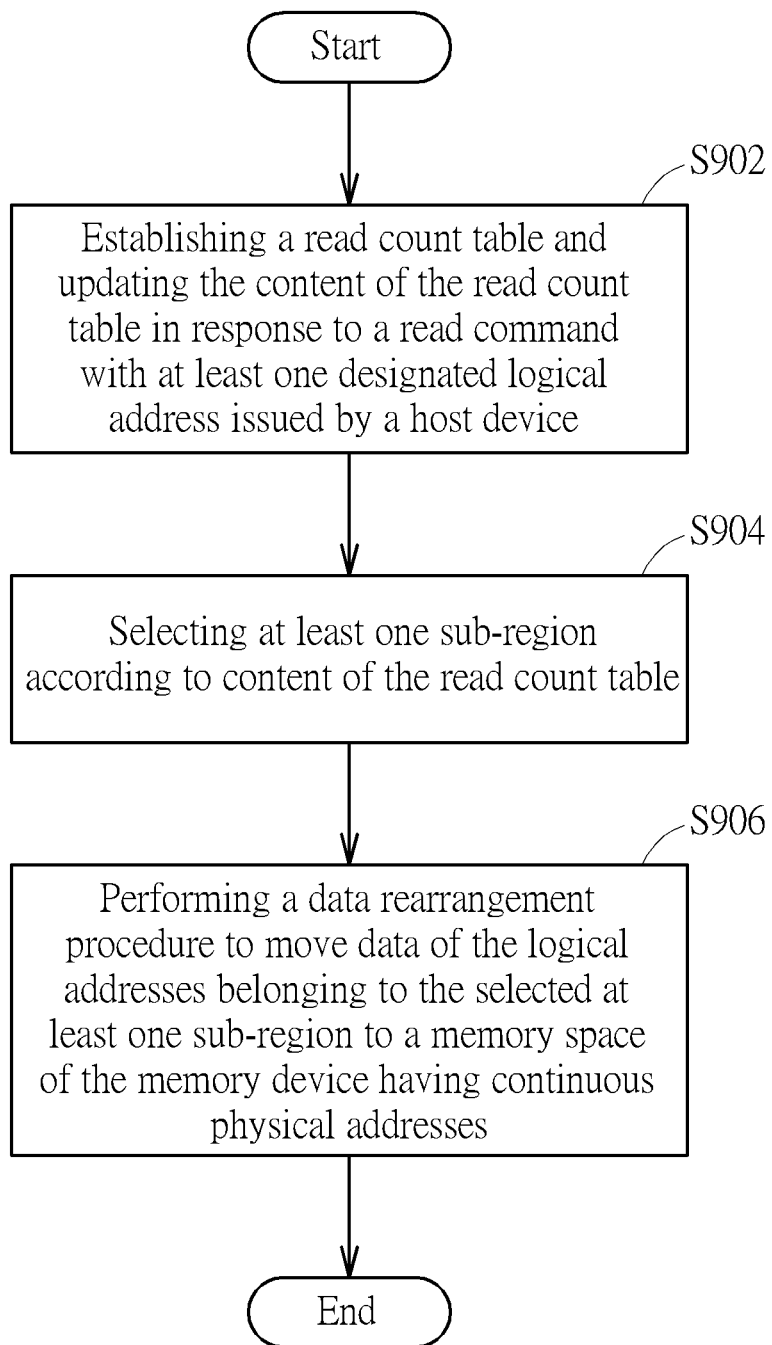
FIG. 9 is a flow chart of a data processing method according to a second embodiment of the invention.

FIG. 9 is a flow chart of a data processing method for a data storage device according to a second embodiment of the invention. The method may be performed by the memory controller 110 and may comprise the following steps:

S902: Establishing a read count table and updating the content of the read count table in response to a read command with at least one designated logical address issued by a host device.

S904: Selecting at least one sub-region having data to be rearranged according to content of the read count table.

S906: Performing a data rearrangement procedure to move (or, remove or rewrite) data of the logical addresses belonging to the selected at least one sub-region (that is, data of the selected at least one sub-region) to a memory space of the memory device having continuous physical addresses.

Note that that the data processing method in the second embodiment of the invention may be applied under the Host control mode or the Device control mode.

According to a third embodiment of the invention, the memory controller 110 may establish another read count table (such as a Sub-Region HPB read count table) (for distinguishing from the read count table in the second embodiment, hereinafter called HPB read count table) and maintain or update the content of the HPB read count table in response to the HPB READ commands issued by a host device 130, with or carrying a TRANSFER LENGTH greater than 1 for designating more than one logical address to be read. The HPB read count table may comprise a plurality of fields. Each field may be configured to record a HPB read count that is associated with one Sub-Region (e.g.

the HPB Sub-Region). Therefore, the number of fields in the HPB read count table may be equal to the total number of HPB Sub-Regions comprised in the memory device 120.

In the third embodiment of the invention, the HPB read count associated with one Sub-Region is utilized to record the number of times that the associated Sub-Region is read by the host device 130 via an HPB READ command. For example, the HPB read count may be a count value for counting the number of times that the host device 130 issues the HPB read commands to read the data of the logical addresses comprised in the associated Sub-Region. According to an embodiment of the invention, the memory controller 110 may update the content of the HPB read count table in response to the HPB READ commands issued by the host device 130 with a TRANSFER LENGTH greater than 1. In response to reception of an HPB READ command carrying a starting LBA and a TRANSFER LENGTH greater than 1, the memory controller 110 may update the content of the HPB read count table by increasing (e.g. +1 for each HPB READ command) one or more HPB read counts associated with the one or more Sub-Regions that the logical addresses designated in the HPB read command (such as the starting LBA and the subsequent LBAs derived from the starting LBA and the TRANSFER LENGTH) belong to.

According to an embodiment of the invention, the memory controller 110 may further sort the HPB read counts recorded in the HPB read count table and select one or more Sub-Regions having data to be rearranged according to the sorted HPB read counts. For example, the memory controller 110 may select one or more Sub-Regions having the HPB read counts greater than a predetermined value as the one or more Sub-Regions to be rearranged. In an embodiment, the memory controller 110 may sequentially select the Sub-Region(s) having the greatest HPB read count according to the sorted HPB read counts and perform a corresponding data rearrangement procedure on the selected Sub-Region(s), and then remove the HPB read count of the selected Sub-Region(s) that has been rearranged from the sorted HPB read counts. The selection and data rearrangement procedure may be repeatedly performed on different Sub-Regions when required.

According to another embodiment of the invention, the memory controller 110 may calculate an average HPB read count according to the HPB read counts recorded in the HPB read count table and select the at least one Sub-Region to be rearranged according to the average HPB read count. For example, the memory controller 110 may select one or more Sub-Regions having the HPB read counts greater than the average HPB read count as the one or more Sub-Regions to be rearranged.

Figure 10:
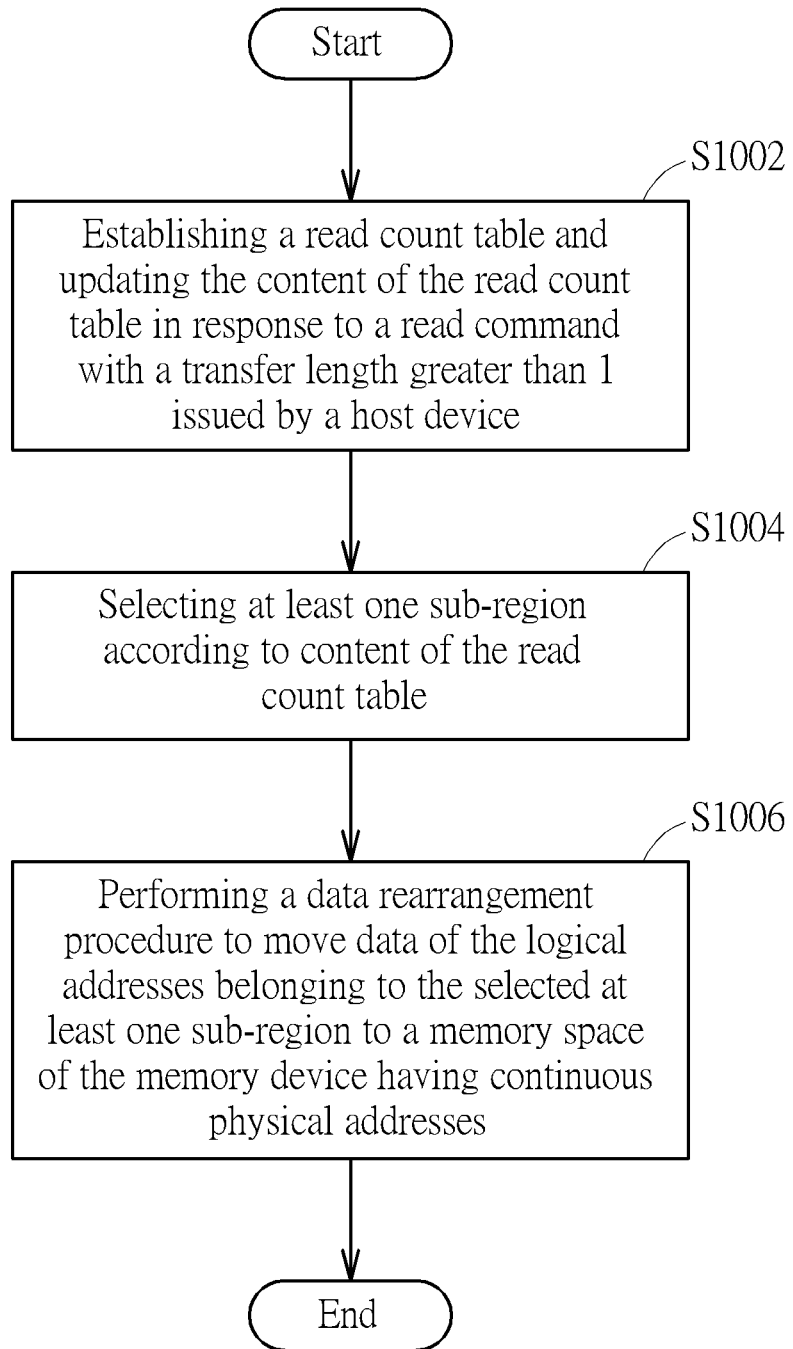
FIG. 10 is a flow chart of a data processing method according to a third embodiment of the invention.

FIG. 10 is a flow chart of a data processing method for a data storage device according to a third embodiment of the invention. The method may be performed by the memory controller 110 and may comprise the following steps:

S1002: Establishing a read count table (e.g. an HPB read count table) and updating the content of the read count table in response to a read command (e.g. an HPB READ command) with a transfer length greater than 1 for designating more than one logical address to be read issued by a host device.

S1004: Selecting at least one sub-region having data to be rearranged according to content of the read count table.

S1006: Performing a data rearrangement procedure to move (or, remove or rewrite) data of the logical addresses belonging to the selected at least one sub-region (that is, data of the selected at least one sub-region) to a memory space of the memory device having continuous physical addresses.

Note that the data processing method in the third embodiment of the invention may be applied under the Host control mode or the Device control mode.

Moreover, in some embodiments of the invention, the data rearrangement procedure (e.g. the data rearrangement procedure in any of the first, second and third embodiments) may be a garbage collection procedure or may be combined in a garbage collection procedure, and the selection of the Sub-Regions to be rearranged may be triggered when a garbage collection procedure is triggered. To be more specific, when any condition that is capable of triggering a garbage collection procedure is met (for example, when the number of spare memory blocks is lower than a predetermined spare block threshold), besides selecting the source memory blocks having valid data to be moved (or, removed or rewritten) to the destination memory block, the memory controller 110 may further select one or more Sub-Regions to be rearranged and perform the corresponding data rearrangement procedure to move (or, remove or rewrite) data of the selected one or more Sub-Regions to a memory space having continuous physical addresses.

In other embodiments of the invention, the data rearrangement procedure may also be combined in other data moving procedure, such as a wear leveling procedure for moving the data of one or more memory blocks having the erase count greater than a predetermined erase count threshold to the memory blocks having relatively lower erase count, a read reclaim procedure for moving the data having the number of ECC error bits greater than a predetermined error bit threshold to a new memory block, a read refresh procedure for moving the data having a read count greater than a predetermined read count threshold to a new memory block, or the likes. In addition, the selection of the Sub-Regions to be rearranged may also be triggered when the data moving procedure is triggered.

In yet other embodiments of the invention, the data rearrangement procedure may also be performed when the data storage device 100 is idle (for example, when the data storage device 100 has not received any commands from the host device 130 for a predetermined period, the data storage device 100 may enter the idle state).

According to an embodiment of the invention, after sorting the activated counts/read counts/HPB read counts recorded in the activated count table/read count table/HPB read count table and selecting one or more Sub-Regions to be rearranged according to the sorted activated counts/read counts/HPB read counts as discussed above in the first, second and third embodiments, the memory controller 110 may further be configured to determine whether data of a plurality of logical addresses belonging to the selected one or more Sub-Regions is not stored in continuous physical addresses. The memory controller 110 may look up the content of the L2P mapping table according to the logical addresses belonging to the selected one or more Sub-Regions to determine whether data of the logical addresses belonging to the selected one or more Sub-Regions is stored in continuous physical addresses or not. When the data of the logical addresses belonging to the selected one or more Sub-Regions is not stored in continuous physical addresses, the memory controller 110 is configured to move (or, remove or rewrite) the data of the logical addresses belonging to the selected one or more Sub-Regions to the memory space having continuous physical addresses. On the other hand, when the data of the logical addresses belonging to the selected one or more Sub-Regions is already stored in continuous physical addresses, the operations of moving the data may be skipped. The memory space having continuous physical addresses may be a memory block (for example, a destination memory bock), or a portion of the storage units having continuous physical addresses in a memory block.

Figure 11:
FIG. 11 is a schematic diagram showing the operations of the data rearrangement procedure according to an embodiment of the invention.

FIG. 11 is a schematic diagram showing the operations of the data rearrangement procedure (e.g. the data rearrangement procedure in any of the first, second and third embodiments) according to an embodiment of the invention. The memory controller 110 may derive which Sub-Region and which Region a logical address belongs to according to the index or content (value) of the logical address. Exemplary relationships between the logical addresses (e.g. the LBAs) and the HPB Region/HPB Sub-Region are shown in FIG. 2. The person of ordinary skill in the art will be able to derive the index of the HPB Region/HPB Sub-Region according to the logical address, and the descriptions are omitted here for brevity.

In the example shown in FIG. 11, suppose that the size of an HPB Region is 32 MB, the size of an HPB Sub-Region is 4 MB and the size of an LBA is 4 KB, one HPB Sub-Region comprises 1000 LBAs. Therefore, the LBAs LBA 0~LBA 999 having the LBA values or indices 0~999 belong to the HPB Sub-Region: HPB Sub-Region (0) having the index 0 and the HPB Region: HPB Region (0) having the index 0.

When the memory controller 110 determines that the HPB Sub-Region (0) has to be rearranged and selects the HPB Sub-Region (0) according to content of the activated count table/read count table/HPB read count table as the embodiments discussed above, the memory controller 110 may move the data of the LBA 0~LBA 999 from the physical addresses {0x000A000, 0x000A001, 0x000A002, 0x000B003, 0x000A004, 0x000A005, 0x000B009, . . . } to a new memory space having continuous physical addresses {0x00000000, 0x00000001, 0x00000002, 0x00000003, 0x00000004, 0x00000005, 0x00000006, . . . } as shown in FIG. 11.

Note that, in some embodiments of the invention, the memory controller 110 may also perform the data rearrangement procedure (e.g. the data rearrangement procedure in any of the first, second and third embodiments) on one or more Regions comprising the selected one or more Sub-Regions, so as to move the data of the whole logical addresses belonging to the one or more Regions comprising the selected one or more Sub-Regions to the memory space having continuous physical addresses. It would be easy for a person having ordinary skill in the art to deduce the data rearrangement operation for moving the data of a whole Region to a memory space having continuous physical addresses based on the embodiment as shown in FIG. 11, and the descriptions are omitted here for brevity.

According to an embodiment of the invention, the memory controller 110 may also accordingly record a plurality of logical addresses in a mapping table for the memory space utilized as a destination memory space in the data rearrangement procedure (e.g. the data rearrangement procedure in any of the first, second and third embodiments). For example, the memory space having continuous physical addresses and utilized in the data rearrangement procedure as the destination memory space may be comprised in a memory block (hereinafter called a destination memory block). The memory controller 110 may accordingly record a plurality of logical addresses in a mapping table corresponding to the destination memory block. The mapping table may be a Physical-to-Logical (P2L) (or called Flash-to-Host (F2H)) mapping table. Different from the global or local L2P mapping table stored in the memory device 120, the P2L mapping table corresponding to the destination memory block may be stored in the buffer memory 116 as a temporary mapping table.

In an embodiment of the invention, the P2L mapping table may comprises a plurality of fields, one field of the P2L mapping table corresponds to one physical address of the destination memory block and is configured to record mapping information of this physical address, where four physical addresses may correspond to one physical page. For example, one physical address may be used to store 4 Kilobyte (KB) data, and the size of one physical page may be 16 KB. The mapping information of a physical address recorded in the P2L mapping table is the physical-to-logical mapping information regarding which logical address the data stored in the corresponding physical address of the destination memory block is directed to.

In addition, the global or local L2P mapping table (hereinafter collectively called the L2P mapping table) stored in the memory device 120 may comprises a plurality of fields, one field of the L2P mapping table is configured to record mapping information of one logical address, where one logical address may correspond to one logical page. The mapping information of a logical address or a logical page recorded in the L2P mapping table is the logical-to-physical mapping information regarding which physical address of the memory device stores data of the corresponding logical address or logical page.

In the embodiments of the invention, the memory controller 110 may be further configured to update content of the P2L mapping table corresponding to the destination memory block and record physical-to-logical mapping information of a plurality of physical addresses of the destination memory block in response to operation of moving the data of the selected one or more Sub-Regions to the destination memory block. In addition, in the embodiments of the invention, after performing the data rearrangement procedure (e.g. the data rearrangement procedure in any of the first, second and third embodiments) and after updating content of the P2L mapping table corresponding to the destination memory block, the memory controller 110 may be further configured to directly update content of the L2P mapping table based on the content of the P2L mapping table.

It should be noted that, after performing the data rearrangement procedure, even if the destination memory block is not full (that is, not fully written with data), the memory controller 110 may still directly update the content of the L2P mapping table based on the content of the updated P2L mapping table corresponding to the destination memory block. That is, before the destination memory block is full, the content of the L2P mapping table may be updated based on the latest content of the P2L mapping table corresponding to the destination memory block as long as the data rearrangement procedure has been performed by the memory controller 110.

In addition, in the embodiments of the invention, the memory controller 110 may be further configured to establish a Sub-Region continuity table and update content of the Sub-Region continuity table after performing the data rearrangement procedure (e.g. the data rearrangement procedure in any of the first, second and third embodiments). The Sub-Region continuity table may comprise a plurality of fields, each field may be associated with one Sub-Region and configured to record whether data of the associated sub-region is stored in continuous physical addresses. For example, each field of the Sub-Region continuity table may store one bit. When the data of a Sub-Region has been moved to the memory space having continuous physical addresses through the aforementioned data rearrangement procedure, the memory controller 110 may set the value of the bit associated with this Sub-Region to 1. Otherwise, the value of the bit associated with this Sub-Region is set to 0 (which may be a default value).

With the information recorded in the Sub-Region continuity table, upon receiving an HPB READ command from the host device 130, especially for the case when TRANSFER LENGTH>1, the memory controller 110 may determine whether the LBA (e.g. the starting logical address) carried in the HPB READ command belongs to a Sub-Region having data stored in continuous physical addresses by checking the value of the associated bit in the Sub-Region continuity table (for example, by checking whether the value of the associated bit in the Sub-Region continuity table is set to 1). If so, the memory controller 110 may directly deduce one or more physical addresses storing the data of one or more subsequent logical addresses to be read after the starting logical address from the physical address encoded in the HPB entry associated with the starting logical address, as long as the one or more subsequent logical addresses also belong to the Sub-Region having data stored in continuous physical addresses. In this manner, when determining that the data of the staring logical address and the one or more subsequent logical addresses is stored in continuous physical addresses, the memory controller 110 may determine to directly skip the operations of looking up or searching the mapping information recorded in the L2P mapping table to find out one or more physical addresses storing the data of the one or more subsequent logical addresses to be read. Since the memory controller 110 may easily derive the required physical addresses and determine whether the operations of looking up or searching in the L2P mapping table can be skipped by simply referring to the content of the Sub-Region continuity table, the access speed can be greatly improved.

It should be noted that, the value of a bit recorded in the Sub-Region continuity table will be changed from 1 to 0 when the data of any LBA belonging to the associated Sub-Region has been updated and stored in another physical address, since the data update will cause the data of the associated Sub-Region to be stored in discontinuous physical addresses.

It should be further noted that, in yet some other embodiments of the invention, the memory controller 110 may establish and maintain more than one count table at the same time, such as the aforementioned activated count table, the aforementioned read count table and the aforementioned HPB read count table, and may select one or more Sub-Regions to be rearranged based on any combination of the content recorded in the activated count table, the read count table and/or the HPB read count table. For example, the memory controller 110 may sum up the activated count, the read count and/or the HPB read of each Sub-Region recorded in the corresponding count tables and sort the summation results to make the aforementioned selection for data rearrangement. For another example, the memory controller 110 may calculate an average value of the activated count, the read count and/or the HPB read of each Sub-Region recorded in the corresponding count tables and sort the average results to make the aforementioned selection for data rearrangement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
   a memory device, comprising a plurality of memory blocks, wherein the memory blocks correspond to a plurality of logical units, each logical unit corresponds to a plurality of logical addresses, the logical addresses corresponding to each logical unit are divided into a plurality of regions and each region is further divided into a plurality of sub-regions each being corresponding to multiple continuous logical addresses; and
   a memory controller, coupled to the memory device and configured to access the memory device and update content of a read count table in response to a read command, issued by a host device, with a transfer length greater than 1 for designating more than one logical address to be read,
   wherein the read count table comprises a plurality of fields, each field is configured to record a read count that is associated with one sub-region and the content of the read count table is updated by increasing the read count(s) associated with the sub-region(s) that logical addresses designated in the read command belong to, and
   wherein the memory controller is further configured to select at least one sub-region to be rearranged according to the content of the read count table and perform a data rearrangement procedure to move data of the logical addresses belonging to the selected at least one sub-region to a first memory space of the memory device having continuous physical addresses, and wherein the first memory space is a first memory block.

2. The data storage device as claimed in claim 1, wherein the memory controller is further configured to sort the read counts recorded in the read count table and select the at least one sub-region to be rearranged according to the sorted read counts.

3. The data storage device as claimed in claim 1, wherein the memory controller is further configured to determine whether the data of the logical addresses belonging to the selected at least one sub-region is stored in continuous physical addresses, and when the data of the logical addresses belonging to the selected at least one sub-region is not stored in continuous physical addresses, the memory controller is configured to move the data of the logical addresses belonging to the selected at least one sub-region to the first memory space having continuous physical addresses.

4. The data storage device as claimed in claim 1, wherein the memory controller is further configured to calculate an average read count according to the read counts recorded in the read count table and select the at least one sub-region to be rearranged according to the average read count.

5. The data storage device as claimed in claim 1, wherein the read command issued by the host device is a Host Performance Booster (HPB) READ command.

6. The data storage device as claimed in claim 1, wherein the memory controller is further configured to move data of a region comprising the selected at least one sub-region to a second memory space of the memory device having continuous physical addresses in the data rearrangement procedure.

7. The data storage device as claimed in claim 1, wherein the memory controller is further configured to update content of a first mapping table in response to an operation of moving the data of the logical addresses belonging to the selected at least one sub-region to the first memory space, and wherein the memory controller is further configured to directly update content of a second mapping table based on the content of the first mapping table after performing the data rearrangement procedure, wherein the first mapping table is configured to record physical-to-logical mapping information of a plurality of physical addresses of the first memory block and the second mapping table is configured to record logical-to-physical mapping information of the logical addresses of the memory device.

8. The data storage device as claimed in claim 1, wherein the memory controller is further configured to establish a sub-region continuity table and update content of the sub-region continuity table after performing the data rearrangement procedure, wherein the sub-region continuity table comprises a plurality of fields, each field is associated with one sub-region and is configured to record whether data of the logical addresses belonging to the associated sub-region is stored in continuous physical addresses.

9. A data processing method for a data storage device, wherein the data storage device comprises a memory device and a memory controller, the memory device comprises a plurality of memory blocks, the memory blocks correspond to a plurality of logical units, each logical unit corresponds to a plurality of logical addresses, the logical addresses corresponding to each logical unit are divided into a plurality of regions, and each region is further divided into a plurality of sub-regions and each sub-region corresponds to multiple continuous logical addresses, the memory controller is coupled to the memory device and configured to access the memory device, and the data processing method is performed by the memory controller and comprises:

establishing a read count table and updating content of the read count table in response to a read command issued by a host device with a transfer length greater than 1 for designating more than one logical address to be read, wherein the read count table comprises a plurality of fields and each field is configured to record a read count associated with one sub-region, and the content of the read count table is updated by increasing the read count(s) associated with the sub-region(s) that logical addresses designated in the read command belong to;

selecting at least one sub-region to be rearranged according to the content of the read count table; and performing a data rearrangement procedure to move data of the logical addresses belonging to the selected at least one sub-region to a first memory space of the memory device having continuous physical addresses, wherein the first memory space is a first memory block.

10. The data processing method as claimed in claim 9, wherein step of selecting at least one sub-region to be rearranged according to the content of the read count table further comprises:

sorting the read counts recorded in the read count table; and selecting the at least one sub-region to be rearranged according to the sorted read counts.

11. The data processing method as claimed in claim 9, wherein step of performing the data rearrangement procedure to move the data of the logical addresses belonging to the selected at least one sub-region to the first memory space of the memory device having continuous physical addresses further comprises:

determining whether the data of the logical addresses belonging to the selected at least one sub-region is stored in continuous physical addresses; and moving the data of the logical addresses belonging to the selected at least one sub-region to the first memory space having continuous physical addresses when the data of the logical addresses belonging to the selected at least one sub-region is not stored in continuous physical addresses.

12. The data processing method as claimed in claim 9, wherein step of selecting at least one sub-region to be rearranged according to the content of the read count table further comprises:

calculating an average read count according to the read counts recorded in the read count table; and selecting the at least one sub-region to be rearranged according to the average read count.

13. The data processing method as claimed in claim 9, wherein the read command issued by the host device is a Host Performance Booster (HPB) READ command.

14. The data processing method as claimed in claim 9, wherein step of performing the data rearrangement procedure to move the data of the logical addresses belonging to the selected at least one sub-region to the first memory space of the memory device having continuous physical addresses further comprises:

moving data of a region comprising the selected at least one sub-region to a second memory space of the memory device having continuous physical addresses.

15. The data processing method as claimed in claim 9, wherein the data processing method further comprises:

updating content of a first mapping table in response to an operation of moving the data of the logical addresses belonging to the selected at least one sub-region to the first memory space, wherein the first mapping table is configured to record physical-to-logical mapping information of a plurality of physical addresses of the first memory block; and directly updating content of a second mapping table based on the content of the first mapping table after performing the data rearrangement procedure, wherein the second mapping table is configured to record logical-to-physical mapping information of the logical addresses of the memory device.

16. The data processing method as claimed in claim 9, further comprising:

establishing a sub-region continuity table, wherein the sub-region continuity table comprises a plurality of fields, each field is associated with one sub-region and is configured to record whether data of the logical addresses belonging to the associated sub-region is stored in continuous physical addresses; and updating content of the sub-region continuity table after performing the data rearrangement procedure.

* * * * *